(12) United States Patent
Wang et al.

(10) Patent No.: US 9,319,175 B2
(45) Date of Patent: Apr. 19, 2016

(54) TECHNIQUES FOR PERFORMING EFFICIENT LINK ADAPTATION IN WIRELESS PERSONAL NETWORKS

(75) Inventors: Dong Wang, Ossining, NY (US); Hongqiang Zhai, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 351 days.

(21) Appl. No.: 13/141,809

(22) PCT Filed: Nov. 21, 2009

(86) PCT No.: PCT/IB2009/055265
§ 371 (c)(1),
(2), (4) Date: Jun. 23, 2011

(87) PCT Pub. No.: WO2010/073143
PCT Pub. Date: Jul. 1, 2010

(65) Prior Publication Data
US 2011/0255438 A1    Oct. 20, 2011

Related U.S. Application Data

(60) Provisional application No. 61/140,801, filed on Dec. 24, 2008.

(51) Int. Cl.
*H04L 1/00* (2006.01)
*H04L 5/00* (2006.01)

(52) U.S. Cl.
CPC ............ *H04L 1/0026* (2013.01); *H04L 1/0027* (2013.01); *H04L 5/0007* (2013.01)

(58) Field of Classification Search
USPC .................. 370/252, 254, 255, 310
See application file for complete search history.

(56) References Cited

U.S. PATENT DOCUMENTS

| | | | | |
|---|---|---|---|---|
| 7,296,205 | B2 * | 11/2007 | Curcio et al. ................. | 714/748 |
| 7,539,207 | B2 * | 5/2009 | Frederiksen et al. ......... | 370/465 |
| 7,602,843 | B2 * | 10/2009 | Cho et al. ...................... | 375/228 |
| 2003/0231706 | A1 * | 12/2003 | Hwang ......................... | 375/219 |
| 2004/0127259 | A1 * | 7/2004 | Matsunaga ................... | 455/560 |
| 2005/0204247 | A1 * | 9/2005 | Guo et al. ............. | H04L 1/1854 714/746 |
| 2006/0215605 | A1 * | 9/2006 | Srikrishna et al. ..... | H04K 3/226 370/329 |
| 2007/0195811 | A1 | 8/2007 | Basson | |

(Continued)

FOREIGN PATENT DOCUMENTS

WO    WO2008149304 A2    12/2008

OTHER PUBLICATIONS

NPL #2: ECMA-368 Standard, High Rate Ultra Wideband PHY and MAC Standard, 2nd Edition, Dec. 2007.*

(Continued)

*Primary Examiner* — Joseph Bednash
(74) *Attorney, Agent, or Firm* — Larry Liberchuk

(57) ABSTRACT

A method (300) for performing link adaptation of wireless links in a wireless network. The method comprises generating a first enhanced link adaptation (ELA) information element (100) by the transmitter (S310); sending the first ELA information element to at least one receiver (S320); upon reception of a second ELA information element at the transmitter, determining optimal transmission parameters for the transmitter, wherein the second ELA information element is generated and sent by the at least one receiver in response to the first ELA information element (S370).

14 Claims, 2 Drawing Sheets

(56) References Cited

U.S. PATENT DOCUMENTS

| | | | |
|---|---|---|---|
| 2008/0186867 A1* | 8/2008 | Schoo | H04L 1/0028 370/252 |
| 2008/0198814 A1* | 8/2008 | Wengerter et al. | H04L 47/14 370/336 |
| 2010/0208675 A1* | 8/2010 | Song | H04W 52/367 370/329 |
| 2011/0128881 A1* | 6/2011 | Zhai | H04B 17/309 370/252 |

OTHER PUBLICATIONS

NPL #1: IEEE Standard for Local and Metropolitan Area Networks, Part 16: Air Interface for Fixed and Mobile Broadband Wireless Access Systems, IEEE Std 802.16E-2005.*

Harada et al. "Comment Resolutions for MAC", doc IEEE 802.15-07-0225-01-003c, Project: IEEE P802.15 Working Group for Wireless Personal Area Networks (WPANs), Apr. 2008.*

IEEE Std 802.15.3TM-2003, IEEE Computer Society, Sep. 29, 2003.*

IEEE Std 802.15.3TM-2003, IEEE Computer Society, May 5, 2006.*

Pyo et al, "Questions/Comments on AV-OFDM MAC", IEEE 802.15-08-0240-00-003c, Project: IEEE P802.15 Working Group for Wireless Personal Area Networks (WPANs), Apr. 16, 2008; Slides 11 and 13.*

Baykas, "Memo of Tele-Conference Call of TG3c, Apr. 16, 2008", IEEE802.15-08/0242r0, IEEE P802.15 Working Group for Wireless Personal Area Networks (WPANs), Apr. 16, 2008.*

Gilb, "DF3 issues tracking", IEEE P802.15.3-08/0255r4, IEEE P802.15 Working Group for Wireless Personal Area Networks (WPANs), May 2008.*

Gilb "AV PHY updates", Draft 15-08-0253-00, IEEE P802.15 Working Group for Wireless Personal Area Networks (WPANs), May 6, 2008; pp. 2-3.*

Pyo et al., "Questions/Comments on AV-OFDM MAC", IEEE 802.15-08-0243-01-003c, IEEE P802.15 Working Group for Wireless Personal Area Networks (WPANs), Apr. 21, 2008.*

ECMA International: "Standard ECMA-368 High Rate Ultra Wideband PHY and MAC Standard 2nd edition", Internet Citation, Dec. 1, 2007, pp. I-VIII,1, XP002563778, Retrieved from the Internet: http://www.ecma-international.org/publications/files/ECMA-ST/ECMA-368%202nd%20edition%20December%202007.pdf>.

* cited by examiner

TECHNIQUES FOR PERFORMING EFFICIENT LINK ADAPTATION IN WIRELESS PERSONAL NETWORKS

This application claims the benefit of U.S. Provisional Application No. 61/140,801 filed on Dec. 24, 2008.

The invention generally relates to a WiMedia medium access control (MAC) protocol, and more particularly to MAC link adaptation techniques.

The WiMedia specification, version 1.0, for ultra-wideband (UWB) systems defines a fully distributed medium access control (MAC) protocol for wireless personal area networks (WPANs). A WPAN is designed to permit communication between devices within a very short range (e.g., about 10 meters). The WiMedia MAC protocol provides a mechanism for concurrent communications between devices of the network.

The WiMedia specification supports a number of different transmission (channel) rates, including 53.3 Mbps, 80 Mbps, 106.7 Mbps, 160 Mbps, 200 Mbps, 320 Mbps, 400 Mbps, and 480 Mbps. A new generation of WiMedia specification, version 1.5, is being developed to allow more transmission rates of up to 1 Gbps.

The bandwidth available on the UWB and the supported transmission rates can be utilized to enable advanced applications, e.g., real-time multimedia streaming and medical applications. However, such applications have strict quality of service (QoS) and latency requirements, which cannot be fulfilled when a fixed transmission rate is utilized to transfer data over a wireless link between two devices. Furthermore, the quality of a wireless link dynamically changes according to conditions and could be significantly degraded if moving objects are around the link. For example, people walking or standing in the line-of-sight between two devices reduce the quality of a wireless link between the devices.

To this end, the WiMedia MAC implements a link adaptation technique enabling a receiver (i.e., a device receiving data) to select optimal transmission parameters, such as a rate, taking into account current link conditions and forwarding these transmission parameters to a transmitter (i.e., a device transmitting data). The transmitter, in turn, can modify its transmission parameters accordingly. However, as the receiver cannot derive exact information about traffic pattern/load and QoS requirements of an incoming data stream, the receiver may not be able to select the optimal parameters.

Moreover, the current WiMedia MAC protocol provides a limited support for link adaptation. Specifically, there is only a link feedback information element designed to support the link adaptation. A receiver can use the link feedback information element to provide the suggested transmission rate and power to the transmitter. There is no way to adapt other transmission parameters, such as a physical layer packet size, which may greatly affect the overall performance of a WiMedia network.

Therefore, it would be advantageous to provide an efficient link adaptation technique to be utilized by a WiMedia MAC protocol.

Certain embodiments herein include a method for performing link adaptation of wireless links between a transmitter and at least one receiver. The method comprises generating a first enhanced link adaptation (ELA) information element by the transmitter; sending the first ELA information element to at least one receiver; upon reception of a second ELA information element at the transmitter, determining optimal transmission parameters for the transmitter, wherein the second ELA information element is generated and sent by the at least one receiver in response to the first ELA information element.

Certain embodiments herein further include a device operable in a wireless network and capable of forming a frame structure of an ELA information element for transmission over the wireless network. The ELA information element includes an element identification field, a length field for designating the size of the ELA information element, and a plurality of link fields for providing a link adaptation feedback mechanism between the transmitter and the receiver, wherein each of the plurality of link fields includes a Target device address (DevAddr) subfield designating an address of a target device, a control subfield for at least designating an operation mode, a data stream mode, an immediate feedback mode of the link field, a stream bitmap subfield, a link quality information subfield for including link quality measures of a wireless link between the receiver and the transmitter, a non-acknowledged (Non-ACK) subfield for at least designating a number of correctly received data packets for each data stream designated in the stream bitmap subfield.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
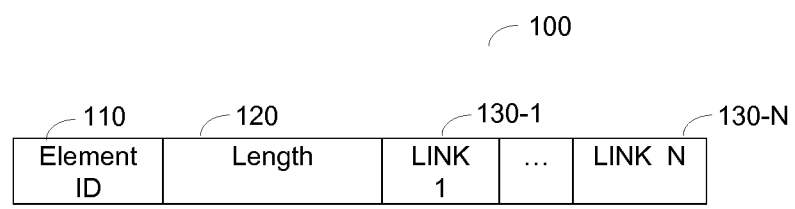
FIG. 1 is a schematic diagram illustrating a structure of an enhanced link adaptation (ELA) information element in accordance with an embodiment.

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain principles, a link adaptation technique performed by a WiMedia MAC protocol is provided. The disclosed technique is based on a new information element, referred to hereinafter as "enhanced link adaptation" or (ELA) information element and a feedback process implemented by the receiver and transmitter. Accordingly, the receiver feedbacks link quality information to the transmitter and the transmitter selects its transmission parameters (e.g., rate and power) based on requirements of a data stream to be transmitted and the link quality information. Information utilized as part of the feedback process is encapsulated in the ELA information element which is schematically illustrated in FIG. 1.

The ELA information element 100 includes the following fields: an element identifier (ID) 110 for designating the ID assigned to the ELA information element 100, a length 120 for designating the length of the ELA information element 100, preferably as a number of octets, and a number of N LINK fields 130-1 through 130-N (where N is an integer number equals or greater than 1) and hereinafter referred to as a LINK field 130 individually. A LINK field 130 corresponds to a target device, which may be either a receiver or transmitter and has a variable length. Thus, when the ELA information element includes multiple LINK fields 130, each may be directed to a different target device. The ELA information element 100 can be transmitted in the beacon period of a device to perform periodic link adaptation or be transmitted as a probe command frame to enable a transmitter to initiate the link adaptation.

Figure 2:
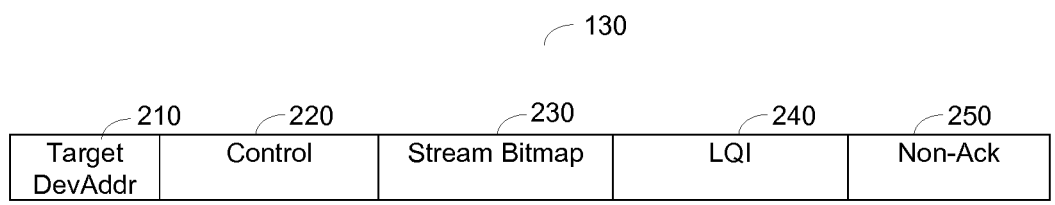
FIG. 2 is a schematic diagram illustrating a structure of a link field of the ELA information.

An exemplary and non-limiting diagram of a LINK field 130 is provided in FIG. 2. The LINK field 130 includes the following subfields: Target device address (DevAddr) 210, control 220, stream bitmap 230, link quality information (LQI) 240, non-acknowledged (Non-ACK) 250. The Target DevAddr 210 designates the address of the device to which the LINK field 130 should be transmitted.

The control subfield 220 designates the operation mode of the LINK field 130, which may be either a request or respond mode. In the request mode the LINK field 130 is initiated to request a target device specified in the Target DevAddr 210 to send the required adaptation link information. This information includes the link quality information and the number of non-acknowledged packets to be included in the subfields LQI 240 and Non-ACK 250, respectively. In the respond mode, the LINK field 130 is a response to a previously received LINK field request. The control subfield 220 also designates a data stream mode of the LINK field 130, which may be either enabled or disabled. When the data stream mode is disabled, the LINK field 130 does not include the subfields stream bitmap 230 and Non-ACK 250.

In accordance with one embodiment, when the LINK field 130 is set to a respond mode, the data stream mode should be set as in its corresponding LINK field 130 request previously received from the target device. When the data stream mode is enabled, the stream bitmap subfield 230 is included, and at least one bit of the subfield 230 is set to 1. In that case, if the i-th bit of the stream bitmap subfield 230 is set to 1, it specifies the number of received packets in a previous superframe of the i-th data stream between the current device and the target device being requested (in the request mode) or reported (in the respond mode). As will be described below the number of correctly received packets of a respective data stream is indicated in the Non-ACK subfield 250. This information can be used by, for example, a MAC layer link adaptation mechanism, to further improve the performance.

The control subfield 220 also indicates whether or not an immediate feedback is requested. An immediate feedback is typically requested when the ELA information element 100 is transmitted in a probe command frame and not during the beacon period. In a request mode, when an immediate feedback is requested, the receiver responds immediately with a probe command frame, including an ELA information element, to feedback the required link quality information to the transmitter. If a LINK field 130 is set to the request mode and the immediate feedback is not requested, the receiver responds with an ELA information element 100 transmitted in its beacon period no later than X (where X is a constant number) superframes to feedback the required link quality information to the transmitter. It should be noted that when the ELA information element 100 includes multiple LINK fields 130 targeted to different devices, each may be set with a different operation mode (i.e., request or respond), data stream mode, and feedback policy.

The LQI subfield 240 is used to feedback the link quality information. Such information is produced by the receiver and may include but, is not limited to, an average signal-to-noise ratio (SNR) of a received signal, a received signal strength indicator (RSSI), or any other link quality parameters, or combination thereof. The link quality information is utilized by the receiver to perform a link adaptation. The LQI subfield 240 is included in a LINK field 130 if it is set to a respond mode.

The Non-ACK subfield 250 contains the number of correctly received data packets corresponding to each data stream designated in the stream bitmap subfield 230. That is, for each i-th bit set to 1 in the subfield 230, the Non-ACK subfield 250 designates the number of correctly received data packets for i-th data stream. For example, if the stream bitmap subfield 230 includes K (K equal or greater than 1) bits set to 1 and their corresponding bit indices are denoted as $e_k > \ldots > e_2 > e_1$, then the length of the Non-ACK subfield 250 is equal to ceil (WK/8) octets, where ceil(.) is a ceiling function. Accordingly, the bits $b_{Wi-1}$-$b_{Wi-W}$ in the subfield 250 include the number of correctly received data packets of the $e_i$-th data stream as received by the receiver. The parameter W is an integer greater than 1, and in a preferred embodiment equals to 10. In accordance with one embodiment of the invention, the Non-ACK subfield 250 may include recommended values for the transmission parameters or any other data stream specific parameters corresponding to each data stream designated in the stream bitmap subfield 230. The Non-ACK subfield 250 is included when the LINK field 130 is set to a respond mode and the data stream mode is enabled.

Figure 3:
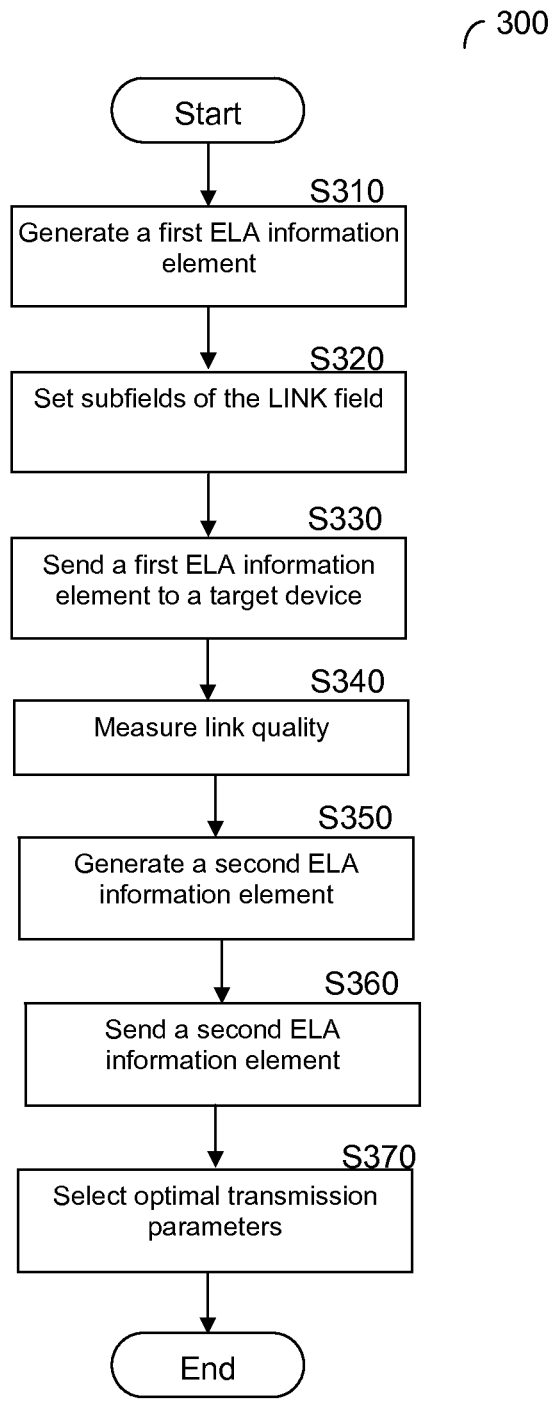
FIG. 3 is a flowchart illustrating a feedback link adaptation technique in accordance with an embodiment.

FIG. 3 shows a non-limiting and exemplary flowchart 300 describing the link adaptation feedback method in accordance with one embodiment of the invention. The method will be described with a reference to a specific but non-limiting example, where the transmission parameters are selected to provide optimal transmission over a wireless link between a transmitter and a single receiver. The receiver and transmitter are neighboring devices in a wireless network. The transmitter may initiate the link adaptation feedback process through a beacon frame or a probe command frame. It should be noted that the method can be utilized to perform the link adaptation feedback of wireless links of any number of neighboring devices in a wireless network. Furthermore, the method can be performed by a MAC protocol as defined in the WiMedia specification or any other MAC protocol designed to support communication in WPANs.

At S310, a first ELA information element (e.g., ELA information element 100) is generated by the transmitter. Specifically, the first ELA information element is constructed to include an element ID field (e.g., field 110) and its value, a length field (e.g., field 120) and its value, and LINK fields (e.g., field 130) according to the number of target devices. As mentioned above, this method is described with reference to an exemplary embodiment when only a single receiver is the target device. Thus, the first ELA information element includes only one LINK field. At S320 the subfields of the LINK field are set. Specifically, the Target DevAddr subfield (e.g., subfield 210) is set to the MAC address of the receiver, the control subfield (e.g., subfield 220) is set to the operation mode, data stream mode, and immediate feedback mode predetermined for the transmitter. Particularly, as the transmitter should know the link quality, the operation mode is set to a request mode and the LINK field is constructed without the LQI and Non-ACK subfields. At S330 the first ELA information element is transmitted to the receiver either as part of a periodic beacon or a probe command frame. The transmission is scheduled according to the selected immediate feedback mode.

At S340, upon reception of the first ELA information element, the receiver measures the quality of the wireless link between the two devices. As mentioned above, the measurements may include, but are not limited to, a SNR, a RSSI, and the like. At S350, a second ELA information element is constructed by the receiver to include an element ID field, a length field, and a LINK field. The LINK field is set to include the address of the transmitter in the Target DevAddr. An operation mode of the control subfield is set to a respond mode, and the data stream and immediate feedback modes are selected according to a policy predetermined for the receiver. If the data stream mode is enabled, the LINK field of the second ELA information element is constructed to include the number of correctly received data packets in the Non-ACK subfield for each data stream designated in the stream bitmap subfield. Furthermore, the LINK field includes the LQI subfield to specify the measured link quality values. At S360, the second ELA information element is transmitted to the transmitter either as part of a periodic beacon or a probe command frame. The transmission is scheduled according to the selected immediate feedback mode.

At S370, upon reception of the second ELA information element, the transmitter determines the optimal transmission parameters (including at least rate and power) based on the requirements of a data stream to be transmitted, as well as the link quality information embedded and/or the number of received packets embedded in the received second ELA information. The data stream requirements may include QoS, type of data, latency, etc.

In accordance with one embodiment of the invention the optimal transmission parameters are determined using a look-up table utilized to estimate a packet error rate (PER) for each data rate mode and each possible packet size option based on the received link quality information (e.g., SNR or RSSI). The values of the look-up table may be predetermined based on simulations or field measurements. Based on the requirements of a data stream, the transmitter can calculate a PER threshold (PER_TH), which is the maximum allowed PER to meet all the requirements of the data stream. The transmitter may compare the estimated PER with the PER_TH and select a highest data rate with a large packet size among all the options that can achieve PER performance better than PER_TH.

In accordance with another exemplary embodiment the optimal transmission parameters may be determined by estimating a real PER value by the transmitter. As the transmitter knows the number of transmitted packets and the number of correctly received packets (designated in the Non-ACK subfield), it may estimate the real PER value (PER_e) based on the ratio between the number of correctly received packets and the number of transmitted packets.

If PER_e is less than or equal to PER_TH, the transmitter may maintain or reduce its transmission power. If PER_e is greater than PER_TH, the transmitter may increase its transmission power to improve performance.

The feedback process described herein can be performed periodically or on-demand when, for example, the quality of the link is degraded. In accordance with another embodiment, the receiver can also initiate the link adaptation feedback method when, for example, the receiver detects that the quality of the link is changed. In this embodiment, the receiver generates an ELA information element to include at least one of the measured link information and the number of correctly received packets. Thereafter, the ELA information is sent to the transmitter which determines the transmission parameters, as described in detail above.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for performing link adaptation of a wireless link between a transmitter and at least one receiver operable in a wireless personal area network (WPAN), comprising:

generating a first enhanced link adaptation (ELA) information element by the transmitter wherein the first ELA information element corresponds to a request mode;

sending, by the transmitter, the first ELA information element to the at least one receiver over the wireless link of the WPAN, wherein the first ELA information element is transmitted during a beacon period when immediate feedback is not requested and transmitted in a probe command frame if immediate feedback is requested;

generating a second ELA information element by the at least one receiver in response to the first ELA information element received by the at least one receiver, wherein the second ELA information element corresponds to a response mode;

sending by the at least one receiver the second ELA information element to the transmitter, wherein the second ELA information element is transmitted during a beacon period if immediate feedback is not requested and transmitted in a probe command frame if immediate feedback is requested; and upon receiving the second ELA information element at the transmitter, determining optimal transmission parameters for the transmitter, the optimal transmission parameters including at least a data rate and transmission power level, based on requirements of at least one data stream to be transmitted, link quality information, and a number of correctly received packets, wherein the link quality information and the number of correctly received packets are included in the received second ELA information element.

2. The method of claim 1, wherein generating the first ELA information element further comprises:

setting an element identification (ID) field of the ELA information element;

setting a length field to the length of the first ELA information element; and setting subfields of at least one LINK field of the ELA information element.

3. The method of claim 2, wherein setting the subfields of the at least one LINK field further comprises:

setting a Target Device Address (DevAddr) subfield to an address of the at least one receiver;

setting a control subfield to designate any one of an operation mode, a data stream mode, and an immediate feedback mode of the link field; and setting at least one bit in a stream bitmap subfield.

4. The method of claim 3, wherein the operation mode is set to the request mode, and the data stream mode and the immediate feedback mode are set according to a predetermined policy.

5. The method of claim 4, wherein the first ELA information element is sent to the at least one receiver at a time scheduled according to the immediate feedback mode.

6. The method of claim 1, wherein the second ELA information element includes an element ID field, a length field, and a link field, the link field including a Target DevAddr subfield, a control subfield, a stream bitmap subfield, a link quality information subfield, a non-acknowledged (Non-ACK) subfield.

7. The method of claim 6, further comprising:
setting the control subfield;
setting the Target DevAddr subfield to an address of the transmitter;
including link quality information measured by the at least one receiver in the link quality information subfield; and
including at least a number of correctly received data packets in the Non-ACK subfield for each of the at least one data stream designated in the stream bitmap subfield.

8. The method of claim 7, wherein the link quality information includes at least one of: an average signal-to-noise ratio (SNR) of a received signal and a received signal strength indicator (RSSI).

9. The method of claim 1, wherein the requirements of the at least one data stream include at least one of guaranteed quality of service (QoS), type of the at least one data stream to be transmitted, and latency.

10. The method of claim 9, further comprising computing a packet error rate (PER) threshold which is a maximum allowed PER to meet the requirements of the at least one data stream; and comparing the PER threshold to an estimated PER to determine the optimal transmission parameters.

11. The method of claim 9, further comprising:
computing a packet error rate (PER) threshold which is a maximum allowed PER to meet the requirements of the at least one data stream;
computing a real PER to be a ratio of a number of incorrectly received packets to a number of transmitted packets; and
comparing the PER threshold to the real PER to determine the optimal transmission parameters.

12. The method of claim 1, wherein when immediate feedback is not requested the receiver sends the ELA information element in a beacon period no later than a specified number of superframes.

13. A non-transitory computer readable medium having stored thereon computer executable code, when executed causing a processor to perform a process of link adaptation of a wireless link between a transmitter and at least one receiver, comprising:
generating a first enhanced link adaptation (ELA) information element by the transmitter wherein the first ELA information element corresponds to a request mode;
sending, by the transmitter, the first ELA information element to the at least one receiver over the wireless link of a wireless personal area network (WPAN), wherein the first ELA information element is transmitted during a beacon period when immediate feedback is not requested and transmitted in a probe command frame if immediate feedback is requested;
generating a second ELA information element by the at least one receiver in response to the first ELA information element received by the at least one receiver, wherein the second ELA information element corresponds to a response mode;
sending, by the at least one receiver, the second ELA information element to the transmitter, wherein the second ELA information element is transmitted during a beacon period if immediate feedback is not requested and transmitted in a probe command frame if immediate feedback is requested; and
upon receiving the second ELA information element at the transmitter, determining at least optimal transmission parameters for the transmitter, the optimal transmission parameters including at least a data rate and transmission power level, based on requirements of a data stream to be transmitted, link quality information, and a number of correctly received packets, wherein the link quality information and the number of correctly received packets are included in the received second ELA information element.

14. A device operable in a wireless personal area network (WPAN), the device comprising:
a processor;
a memory connected to the processor, wherein the memory contains instructions that, when executed by the processor, configure the device to generate a frame structure of an enhanced link adaptation (ELA) information element for transmission over a wireless link of the WPAN, wherein the ELA information element is used to determine optimal transmission parameters, the optimal transmission parameters including at least a data rate and transmission power level, and wherein the ELA information element includes:
an element identification field;
a length field for designating a size of the ELA information element; and
a plurality of link fields for providing link adaptation feedback mechanism between a transmitter and a receiver, wherein each of the plurality of link fields includes a Target device address (DevAddr) subfield designating an address of a target device, a control subfield for designating an operation mode, wherein the operation mode is set to one of a request mode or a response mode, a data stream mode, wherein the data stream mode is enabled when designated by the control subfield and disabled when designated by the control subfield, and an immediate feedback mode of the link field, wherein the ELA information element is transmitted during a beacon period when immediate feedback is not requested and transmitted in a probe command frame if immediate feedback is requested, a stream bitmap subfield, a link quality information subfield for including link quality measures of a wireless link between the receiver and the transmitter, wherein the link quality information subfield is included in a link field of the plurality of link fields when the operation mode is set to the response mode, and a non-acknowledged (Non-ACK) subfield for designating a number of correctly received data packets for each data stream in the stream bitmap subfield, wherein the stream bitmap subfield and Non-ACK subfield are not included in the link field of the plurality of link fields when the data stream mode is disabled for the link field.

* * * * *